United States Patent [19]
Hart

[11] 3,718,180
[45] Feb. 27, 1973

[54] REGENERATOR SEAL
[75] Inventor: Jack P. Hart, Hinsdale, Ill.
[73] Assignee: General Motors Corporation, Detroit, Mich.
[22] Filed: Nov. 11, 1971
[21] Appl. No.: 197,676

Related U.S. Application Data

[62] Division of Ser. No. 879,729, Nov. 25, 1969, Pat. No. 3,638,716.

[52] U.S. Cl. .................................................... 165/9
[51] Int. Cl. ............................................. F28d 19/04
[58] Field of Search ................................. 165/8, 9, 10

[56] References Cited

UNITED STATES PATENTS

| | | | |
|---|---|---|---|
| 3,384,156 | 5/1968 | Addie | 165/9 X |
| 1,912,784 | 6/1933 | Miller et al. | 165/9 X |
| 2,670,934 | 3/1954 | Hammond et al. | 165/9 |

*Primary Examiner*—Albert W. Davis, Jr.
*Attorney*—Paul Fitzpatrick et al.

[57] ABSTRACT

A rotary regenerator of the drum matrix type includes main seals engaging the matrix where it passes through the bulkhead of the regenerator. Each main seal includes a frame closely encircling the matrix with particular means for connecting the main seal to the bulkhead. The frames include side shoes biased by springs against the outer or end faces of the matrix rims. Also, the seal assemblies include bumper stops backed up by bridled springs which allow controlled yielding of the stops if the matrix shifts laterally because of shocks from the vehicle in which the regenerator is mounted. This disclosure incorporated by reference to the parent application, now U.S. Pat. No. 3,638,716.

2 Claims, 1 Drawing Figure

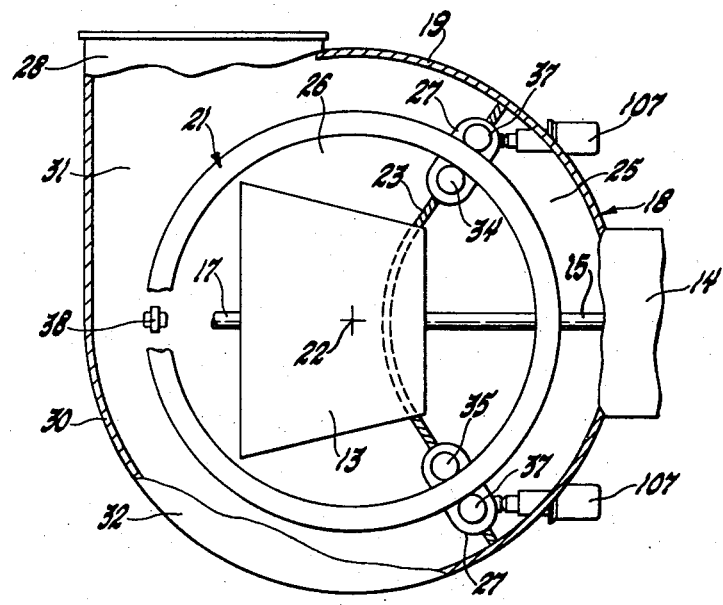

REGENERATOR SEAL

This application is a division of my application Ser. No. 879,729 for Regenerator Seal filed Nov. 25, 1969, now U.S. Pat. No. 3,638,716.

SUMMARY OF THE INVENTION

My invention relates to regenerators, by which I mean heat exchange devices of the sort in which a heat retaining mass is rotated so as to move alternately through the flow paths of two fluids so as to absorb heat from the hotter fluid and release it to the cooler. In some respects, it is particularly concerned with a regenerator having a drum matrix in which flow takes place radially through an annular drum, and with one suited to a gas turbine type of installation.

The particular subject matter of this application is structure of side seals which engage the edges of the matrix to prevent leakage between the seal frame and the matrix along these edges. Also, bumper stops which resiliently stop the matrix when it is shifted axially of the matrix toward the end of the seal frame by some shock.

The principal objects of this invention are to provide improved sealing means for a regenerator matrix and means for absorbing shocks due to lateral movement of the matrix against the ends of the seal frames.

DESCRIPTION OF THE DRAWING

The FIGURE is a somewhat schematic side view, with parts cut away, of a regenerative gas turbine arrangement.

DETAILED DESCRIPTION

For a complete description of the regenerator seal of the Figure and of my invention claimed herein, reference is made to my U.S. patent application Ser. No. 879,729 for Regenerator Seal, filed Nov. 25, 1969, now U.S. Pat. No. 3,638,716.

Substantially the entire specification and drawings of that application are pertinent to an understanding of the subject matter of this invention in its preferred embodiment.

Reference is made to the specification and drawings of Ser. No. 879,729 which are incorporated herein by reference and made a part hereof as if fully described herein.

The portions of the disclosure of Ser. No. 879,729 which are most pertinent to the subject matter claimed herein are set out from column 5, line 40 through column 6, line 9 of the patent specification and in FIGS. 3, 4, 8, and 10 of the drawings; therefore, attention is particularly directed to those portions.

CONCLUSION

It should be clear to those skilled in the art from the foregoing that the seal described and claimed herein represents a significant improvement over prior art devices and is particularly suited to the requirements of gas turbine regenerator installations.

The detailed description of the preferred embodiment of the invention for the purpose of explaining the principles thereof is not to be considered as limiting or restricting the invention, as many modifications may be made by the exercise of skill in the art.

I claim:

1. A rotary regenerator including a case, a bulkhead, a rotatable annular radial-flow matrix, and main seals cooperating with the matrix at the bulkhead, each main seal comprising a frame closely encircling the matrix, in combination with side seal means engaging the ends of the matrix, each side seal means at one end of the matrix comprising, in combination, a side shoe biased into engagement with the end of the matrix, the side shoe including means engaging the frame locating the side shoe circumferentially of the matrix; spring means biasing the shoe into engagement with the matrix including a closed spring housing and a spring within the housing coupled to the side shoe; and a bumper stop adjacent the side shoe at each end of the matrix, the bumper stop being elastically yieldable and being normally spaced slightly from the matrix.

2. A rotary regenerator including a case, a bulkhead, a rotatable annular radial-flow matrix, and main seals cooperating with the matrix at the bulkhead, each main seal comprising a frame closely encircling the matrix, in combination with side seal means engaging the ends of the matrix, each side seal means at one end of the matrix comprising a side shoe biased into engagement with the end of the matrix, the side shoe including means engaging the frame locating the side shoe circumferentially of the matrix; and a bumper stop adjacent the side shoe at each end of the matrix, the bumper stop being elastically yieldable and being normally spaced slightly from the matrix.

* * * * *